United States Patent [19]

Epting et al.

[11] Patent Number: 5,303,311
[45] Date of Patent: Apr. 12, 1994

[54] METHOD AND APPARATUS FOR RECOGNIZING CHARACTERS

[75] Inventors: Alec K. Epting; Terry A. Will, both of Charlotte, N.C.

[73] Assignee: International Business Machines Corporation, Armonk, N.Y.

[21] Appl. No.: 865,608

[22] Filed: Apr. 9, 1992

Related U.S. Application Data

[63] Continuation-in-part of Ser. No. 491,895, Mar. 12, 1990, Pat. No. 5,105,470.

[51] Int. Cl.$^5$ .............................................. G06K 9/00
[52] U.S. Cl. .............................................. 382/10; 382/21
[58] Field of Search ..................... 382/10, 13, 20, 21, 382/22, 23, 24, 27

[56] References Cited

U.S. PATENT DOCUMENTS

| | | | |
|---|---|---|---|
| 2,978,675 | 4/1961 | Highleyman | 382/39 |
| 4,115,760 | 9/1978 | Ito | 382/55 |
| 4,177,448 | 12/1979 | Brayton | 382/14 |
| 4,757,551 | 7/1988 | Kobayashi et al. | 382/21 |
| 4,813,078 | 3/1989 | Fujiwara et al. | 382/21 |
| 4,888,812 | 12/1989 | Dinan et al. | 382/7 |
| 4,959,870 | 9/1990 | Tachikawa | 382/21 |
| 5,105,470 | 4/1992 | Will et al. | 382/13 |
| 5,131,054 | 7/1992 | Smith | 382/27 |
| 5,267,328 | 11/1993 | Gouge | 382/21 |

OTHER PUBLICATIONS

Electronics and Communications In Japan, vol. 53-C, No. 10, 1970, "Design of Handwritten-Numeral Recognizer" by S. Yamamoto et al, pp. 134–142.

IEEE Transactions On Pattern Analysis And Machine Intelligence, PAMI-6 Jul. (1984), No. 4, "Research on Machine Recognition of Handprinted Characters" by S. Mori et al, pp. 386–405.

Primary Examiner—Joseph Mancuso
Assistant Examiner—Steven P. Klocinski

[57] ABSTRACT

A character recognition system identifies characters including hand written characters with a high degree of accuracy by use of spiral view codes for pels in the scanned character image. The spiral view codes are developed by comparing stroke length or distance to a remote stroke from a first radial view from a character pel to stroke length or distance to a remote stroke from a counterclockwise adjacent view for the same character pel. These spiral view codes are collected into a spiral view pattern for each character pel. The spiral view patterns for a character are accumulated to form a character vector. The character vector is analyzed by a linear decision network or a neural network.

21 Claims, 11 Drawing Sheets

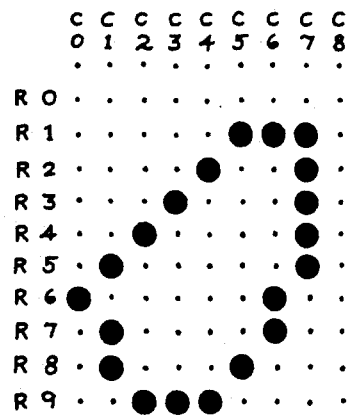
Fig. 5.
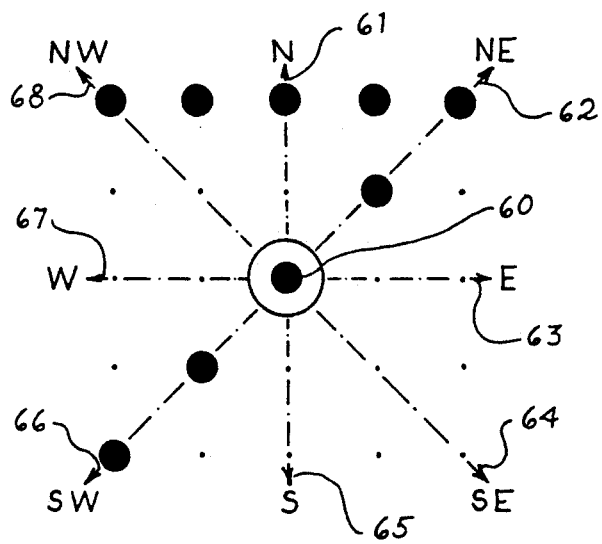
Fig. 6.
| VIEW DESCRIPTION | VIEW NUMBER |
|---|---|
| NO BLACK PEL IN PATH | 0 |
| ADJACENT PEL IS BLACK | 1 |
| ADJACENT PEL IS WHITE FOLLOWED EVENTUALLY BY BLACK | 2 |
Fig. 7.

| N | NE | E | SE | S | SW | W | NW |
|---|----|---|----|----|----|---|----|
| 2 | 1  | 0 | 0  | 0  | 1  | 0 | 2  |

Fig. 8.

| LINE | LOCATION | N | NE | E | SE | S | SW | W | NW | $P_1$ | $P_2$ | $P_3$ ... |
|------|----------|---|----|---|----|---|----|---|----|-------|-------|-----------|
| 1 | $R_1, C_5$ | 0 | 0 | 1 | 2 | 2 | 1 | 0 | 0 | $a_1$ | $a_2$ | $a_3$ |
| 2 | $R_1, C_6$ | 0 | 0 | 1 | 1 | 2 | 0 | 1 | 0 | $b_1$ | $b_2$ | $b_3$ |
| 3 | $R_1, C_7$ | 0 | 0 | 0 | 0 | 1 | 2 | 1 | 0 | $c_1$ | $c_2$ | $c_3$ |
| 4 | $R_2, C_4$ | 0 | 1 | 2 | 2 | 2 | 1 | 0 | 0 | $d_1$ | $d_2$ | $d_3$ |
| 5 | $R_2, C_7$ | 1 | 0 | 0 | 0 | 1 | 2 | 2 | 1 | $e_1$ | $e_2$ | $e_3$ |
| . | . | | | | | | | | | | | |
| . | . | | | | | | | | | | | |
| . | . | | | | | | | | | | | |
| n-3 | $R_8, C_5$ | 2 | 1 | 0 | 0 | 0 | 1 | 2 | 2 | $f_1$ | $f_2$ | $f_3$ |
| n-2 | $R_9, C_2$ | 2 | 2 | 1 | 0 | 0 | 0 | 0 | 1 | $g_1$ | $g_2$ | $g_3$ |
| n-1 | $R_9, C_3$ | 2 | 2 | 1 | 0 | 0 | 0 | 1 | 2 | $h_1$ | $h_2$ | $h_3$ |
| n | $R_9, C_4$ | 2 | 1 | 0 | 0 | 0 | 0 | 1 | 2 | $i_1$ | $i_2$ | $i_3$ |

Fig. 9.

| PEL 80 | N | NE | E | SE | S | SW | W | NW |
|---|---|---|---|---|---|---|---|---|
| Lv | 0 | 8 | 3 | 3 | 3 | 3 | 0 | 0 |
| Lv-45 | 0 | 0 | 3 | 3 | 3 | 3 | 3 | 0 |
| Dv | 5 | 0 | 8 | 3 | 10 | 7 | 3 | 5 |
| Dv-45 | 5 | 5 | 0 | 0 | 7 | 10 | 0 | 0 |
| RSv | Y | Y | N | Y | Y | Y | Y | Y |
| RSv-45 | Y | Y | N | N | Y | Y | N | N |
| SVP | 3 | 1 | 0 | 3 | 3 | 2 | 0 | 3 |

| PEL 84 | N | NE | E | SE | S | SW | W | NW |
|---|---|---|---|---|---|---|---|---|
| Lv | 0 | 0 | 9 | 2 | 2 | 2 | 8 | 0 |
| Lv-45 | 0 | 0 | 0 | 9 | 2 | 2 | 2 | 8 |
| Dv | 0 | 0 | 0 | 3 | 7 | 2 | 2 | 0 |
| Dv-45 | 0 | 0 | 0 | 0 | 3 | 0 | 0 | 0 |
| RSv | N | N | N | Y | Y | Y | N | N |
| RSv-45 | N | N | N | N | Y | Y | N | N |
| SVP | 1 | 1 | 1 | 2 | 3 | 0 | 1 | 0 |

METHOD AND APPARATUS FOR RECOGNIZING CHARACTERS

CROSS REFERENCE TO RELATED PATENTS

This application is a Continuation-In-Part of commonly-assigned, copending patent application Ser. No. 07/491,895, filed Mar. 12, 1990, now U.S. Pat. No. 5,105,470 issued on Apr. 14, 1992, to T. A. Will and entitled "Method And System For Recognizing Characters."

The present invention also relates to the following patents which are specifically incorporated herein by reference:

1. "Method and System for Locating Amount Field on a Document" U.S. Pat. No. 5,119,433 issued Jun. 2, 1992, by T. A. Will filed concurrently, sometimes referred to as the "Field Find Patent".

2. U.S. Pat. No. 4,888,812 to Dinan et al., entitled "Document Image Processing System".

BACKGROUND OF THE INVENTION

1. Field of the Invention

This invention is directed to a method and apparatus for recognizing document characters that have been scanned and digitized into dot patterns. More particularly, the present invention has applicability in any character recognition task, but is particularly useful in recognizing handwritten characters; for example, characters handwritten on bank checks.

2. Description of Prior Art:

Character recognition techniques in the past have matched characters against templates, or scanned key regions of characters, to look for key character features that would identify a character. These techniques work well as long as the character set being recognized is constrained to particular shapes or key features. As soon as the constraints are relaxed, as in the case of handwritten characters, template and key feature analysis of characters has a low probability of success.

One technique for dealing with handwritten characters is taught in U.S. Pat. No. 4,757,551 issued Jul. 12, 1988 to Kobayashi et al and entitled "Character Recognition Method and System Capable of Recognizing Slant Characters." The Kobayashi et al patent attempts to deal with handwritten characters by detecting the slant of character strokes and comparing character information to information stored in two different libraries of characters that differ based on the slant of the reference characters in the library. Kobayashi uses directionality codes for character contour pels. The directionality codes simply indicate the direction from a given character pel to its next adjacent pels in the character. A histogram of these directionality codes is taken for sections of the character and matched against a library of histograms of reference character features to recognize the character.

One difficulty with Kobayashi's technique is that it is basically a template matching technique and requires large numbers of templates (reference histograms) against which the character feature histograms must be matched. Thus, the technique requires large amounts of storage and is time consuming to execute.

SUMMARY OF THE INVENTION

It is an object of this invention to improve the accuracy of recognition of characters and, particularly, low constraint machine-print (omni) characters or handwritten characters.

It is a further object of this invention to reduce the time required to accurately recognize characters particularly, omni or handwritten characters.

In accordance with this invention, the above objects are accomplished by using radial view patterns from selected pels in a digitized dot pattern of a character to detect the presence of remote strokes in the character. More particularly, the view patterns are spiral view patterns that contain remote stroke information in more than one radial direction. The selected pels may be all pels of the character, pels that outline the character, or core pels that represent the interior of the character stroke. The spiral view pattern from a pel includes eight radial view directions. Further, to each view direction there is added a view rotated 45° counterclockwise. In each of the view encodings, a stroke length or distance to a remote stroke in a particular direction is compared to a stroke length or distance to a remote stroke in a counterclockwise adjacent direction. The comparisons give an indication of the direction of either the stroke containing the pel of interest or of a remote stroke segment. Thus, the information in the spiral view pattern-per-pel contains a radial component of character stroke information and a rotational component of character stroke information and, hence, the name spiral view pattern.

A count of identical view patterns from pels in the character are accumulated. The counts by view pattern form a character vector. The character vector is then analyzed in a linear decision network, or a neural network, to determine which character the character vector represents. The view pattern counts are weighted and summed in a manner so that character vectors for a particular character shape will cluster in the sense of having similar weighted sums. The linear decision network can then distinguish each character. A neural network is used to collect weighted sums for similar character features into one or more subclusters. These intermediate weighted sums are then weighted and summed again to classify similar character sums into a single class recognizable as a character associated with that class.

The great advantage of the invention is that the comparisons in the spiral view encodings are powerful because they contain information about the direction of character strokes. Further, the additional rotational component of information in the spiral view pattern, combined with the accumulation of like spiral patterns, is indicative of character features that are common to a given character. Furthermore, the character vectors may be rapidly processed into character clusters by a linear decision network, or a neural network. There is no time consuming matching of character features against reference patterns.

Other objects, advantages and features of the invention will be understood by those of ordinary skill in the art after referring to the complete written description of the preferred embodiments in conjunction with the following drawings.

p BRIEF DESCRIPTION OF THE DRAWINGS

FIG. 5 shows a skeletonized and normalized version of the character of FIG. 4.

FIG. 6 illustrates a view pattern recognition system useful in developing a multi-directional vector of what is seen from a given pel.

FIG. 7 is a table which describes the sighting from a particular pel in a particular direction, and assigns a view number to that sighting.

FIG. 8 illustrates the sample vector for a pel in FIG. 6.

FIG. 9 illustrates a table including view vectors and probabilities for the character of FIG. 5.

DESCRIPTION OF THE PREFERRED EMBODIMENTS

Figure 1:
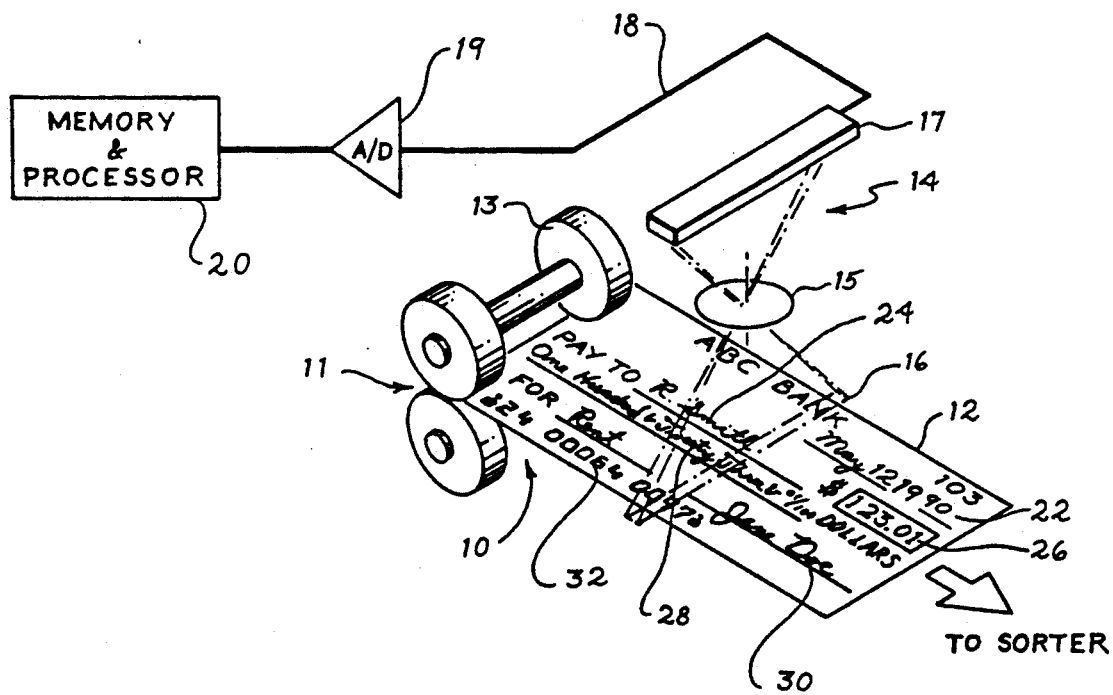
FIG. 1 illustrates the environment of the present invention, an image document processing system.

FIG. 1 illustrates an image capture system 10, within a document image processing system 11, such as IBM's Model 3890 Image Plus High Performance Transaction system. Such a system typically uses a transport 13 to move a document 12 one at a time from an input hopper (not shown) sequentially past a plurality of other processing stations, and finally into one of several output hoppers or pockets, based usually upon the information content read from the document under program control as it passes. This transport moves the document at a high speed (over 300 inches per second in a Model 3890 which allows the system to process 2400 documents per minute).

An optical system 14, including a focusing lens 15, uses an extended array 17 to capture an electrical representation of each line 16 of the document, based on either the black/white or gray characteristics of the document. While the resolution of the system depends on the design and components, one example divides each inch into 240 picture elements (pels or pixels) in each of the horizontal and vertical directions.

The array 17 is commercially available from various manufacturers, such as Reticon, and may be a charge coupled device in which the impinging light on each sensor develops an electrical signal proportional to the amount of light. The electrical signals pass on line 18 to an analog-to-digital converter 19, which together with thresholding, converts each pel into a digital representation, which is then stored in memory 20 for storage and/or further processing as desired. For further details of an image capture and processing system, see U.S. Pat. No. 4,888,812 to Dinan et al., which is specifically incorporated herein by reference.

The document 12 includes a variety of indicia, some of which may be printed and some may be handwritten. Other documents may include typewritten characters or those printed by machine. This indicia includes a date field 22, a payee line 24, an amount field 26 (sometimes referred to as a "courtesy amount field" which comprises numerals rather than words in most cases), a field 28 including the amount in words, a signature 30 and a MICR codeline 32.

Figure 2:
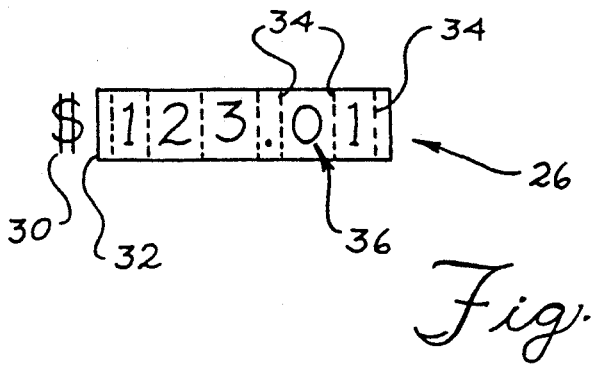
FIG. 2 shows an amount field from a sample check of FIG. 1.

FIG. 2 illustrates the amount field 26 from the document 12 of FIG. 1 enlarged. The amount field 26 includes a "$" identified by the reference numeral 30, and a box 32 with the amount field therein. Dotted lines, referenced by the numeral 34, illustrate how the amount field has been segmented. This segmentation is accomplished through any one of several known techniques.

As a result of the segmentation, each character is separately identified, if possible, for presentation to the character recognition algorithm of the present invention.

In this case, the reference numeral 36 identifies the 0 in the amount field occurring after a decimal point and before the 1. Later discussion herein, particularly in connection with FIGS. 4, 5, and 9, will illustrate the use of this character in the recognition process.

Radial View Patterns

Figure 3:
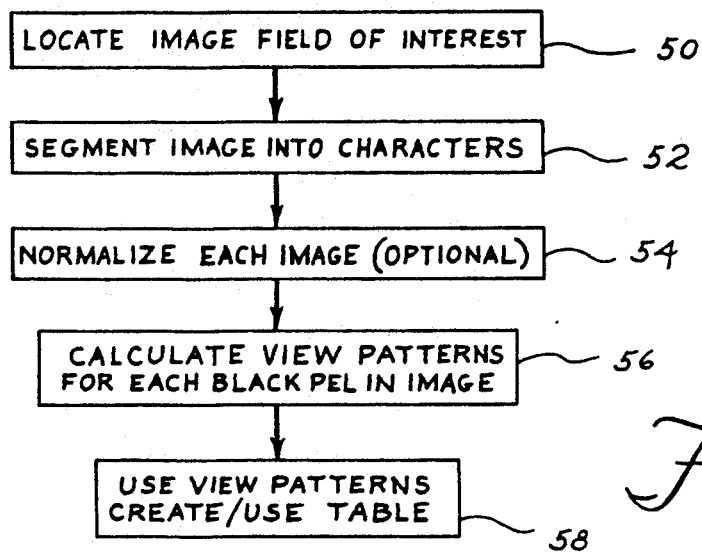
FIG. 3 shows a flow diagram for the logic of using radial view patterns to recognize characters.

FIG. 3 illustrates the logic, or flow, for identifying a character using radial view patterns. At block 50, a field, such as the amount field, is identified and, if desired, that section is copied for further processing into a small but separate field. This could be advantageously done by the field find patent referenced above. Next, at block 52, the image is segmented into individual characters or other indicia to be recognized such as a "$", decimal point or other individual character to be recognized. This could be done in any one of the several known methods for character segmentation.

Next, at block 54, the image is normalized, then the view patterns are calculated at block 56. All this will be discussed in more depth in connection with FIGS. 6 to 9; particularly, FIG. 6. These view patterns in the preferred embodiment include taking view patterns at each of the black pels in the normalized image from the block 54. Next, at block 58, the view patterns are used. A training set generates the probabilities for each of the vectors generated (see FIG. 8); in the training mode, these view patterns are used to generate a look-up table.

The process in FIG. 3 has been described in conjunction with a normalized image; that is, one which has been reduced to a skeleton, or stroke width, of a single pel wide. If this is not done, then one may desire to know not only where the next black pel is, but how long a black segment is there. This suggests one or more additional view descriptions could be added to FIG. 7 and the vectors of FIGS. 8 and 9.

The view patterns of an unknown character X are applied to the previously-created table to look up the probability that a given vector (FIG. 8) relates to each of the characters in the character set.

Figure 4:
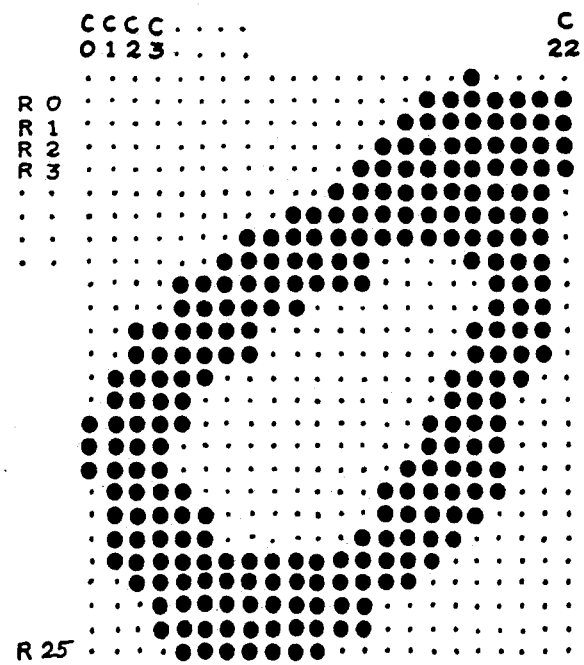
FIG. 4 shows a matrix of the pel elements of a character from the amount field of FIG. 2.

FIG. 4 illustrates the character 0 from the amount field in FIG. 2. As shown in this figure, there are a plurality of horizontal rows (R0-R25) and a plurality of columns (column C0-column C22) which comprised the rectangular array that has been identified as containing the character 0.

This character is then normalized to create the image of FIG. 5, including rows (R0-R9) and columns (C0-C7).

FIG. 6 illustrates a different character (the numeral 7) with a central pel 60, which has been circled, and eight radiating lines numbered 61-68 leading in each of the eight identified compass directions; that is, line 61 looks north from the pel 60, line 62 looks northeast, line 63 looks east and so forth until line 68 looks northwest. Along each of these lines throughout the entire character box, the question is whether a black pel is in that path and, if so, where?

As shown in FIG. 7, the view description from any given pel looking in any particular direction either has no black pel in that path (in which case, it is assigned a view number of 0), the adjacent pel in that path is black (in which case, it is assigned a view number of 1) or the adjacent pel is white followed eventually by a black in that path (in which case, the view number of 2 is assigned). A view number of 2 is also assigned in the case where a diagonal line passes between two black lines only one-half space away. These view numbers and view descriptions are somewhat arbitrarily assigned, and other techniques of describing and numbering could be used to advantage.

Accordingly, in FIG. 8, a view pattern for the pel 60 in FIG. 6 has been identified; that is, in the direction along the line 61, looking North from the pel 60 the adjacent pel is white followed later by a black pel, leading to a view number of 2. In the Northeast direction along line 62, the adjacent pel is black, leading to a view number of 1 in the Northeast direction. In the East direction along line 63, there is no black pel in the path from pel 60 to the eastern edge of the character; therefore, the view number is 0. Similarly, in the Southeast direction, there is again no black pel in the path as is the case in the southern direction along line 65. Along the line 66, looking Southwest from the pel 60 the adjacent pel is black, leading to a view number of 1 being assigned. In the direction West from the pel 60, there is no black pel in the path leading to the view number of 0 and, in the Northwest direction along line 68, there is an adjacent white pel followed eventually by a black pel, leading to a view number of 2 for the Northwest direction.

Applying this technique to the pattern of FIG. 5 creates the table shown in FIG. 9. In this table, the line number 1, which corresponds to location R1, C5, has the vector of "00122100" in the directions of North (N), Northeast, East, Southeast, South, Southwest, West, and Northwest, respectively.

Line 2 is a similar view pattern for the next black pel located at R1C6. This continues for each black pel, only some of which have been listed here.

Then for each of the vectors created (for example, the vector 00122100) for line 1, there is a probability that has been established and stored in a look-up table that that vector is associated with each character state permitted. For the numeral set, the character states permitted would be the numerals 0-9, while an amount field might have extra characters such as a $, a decimal point, and other symbols which are permitted and would be attempted to be recognized.

After all of the probabilities for lines 1 through N have been determined, the probability of the character to be identified as the first character in the set is the product of the individual probabilities, that is, for the first element in the set it would be A1 X B1 X C1 X D1 X E1 etc. through I1. The probability that this character is the second character in the set would be A2 X B2 etc. through I2.

These products then can be normalized, and the probability of an unknown character being one element can be compared with the probability that it is the next element. Appropriate recognition algorithms then can be used to set threshold limits as to how high a probability in absolute value is required in order to consider the character successfully recognized and secondly how far that first candidate has to be greater than the second candidate before the issue is too close to call.

Spiral View Patterns

Figures 10, 16:
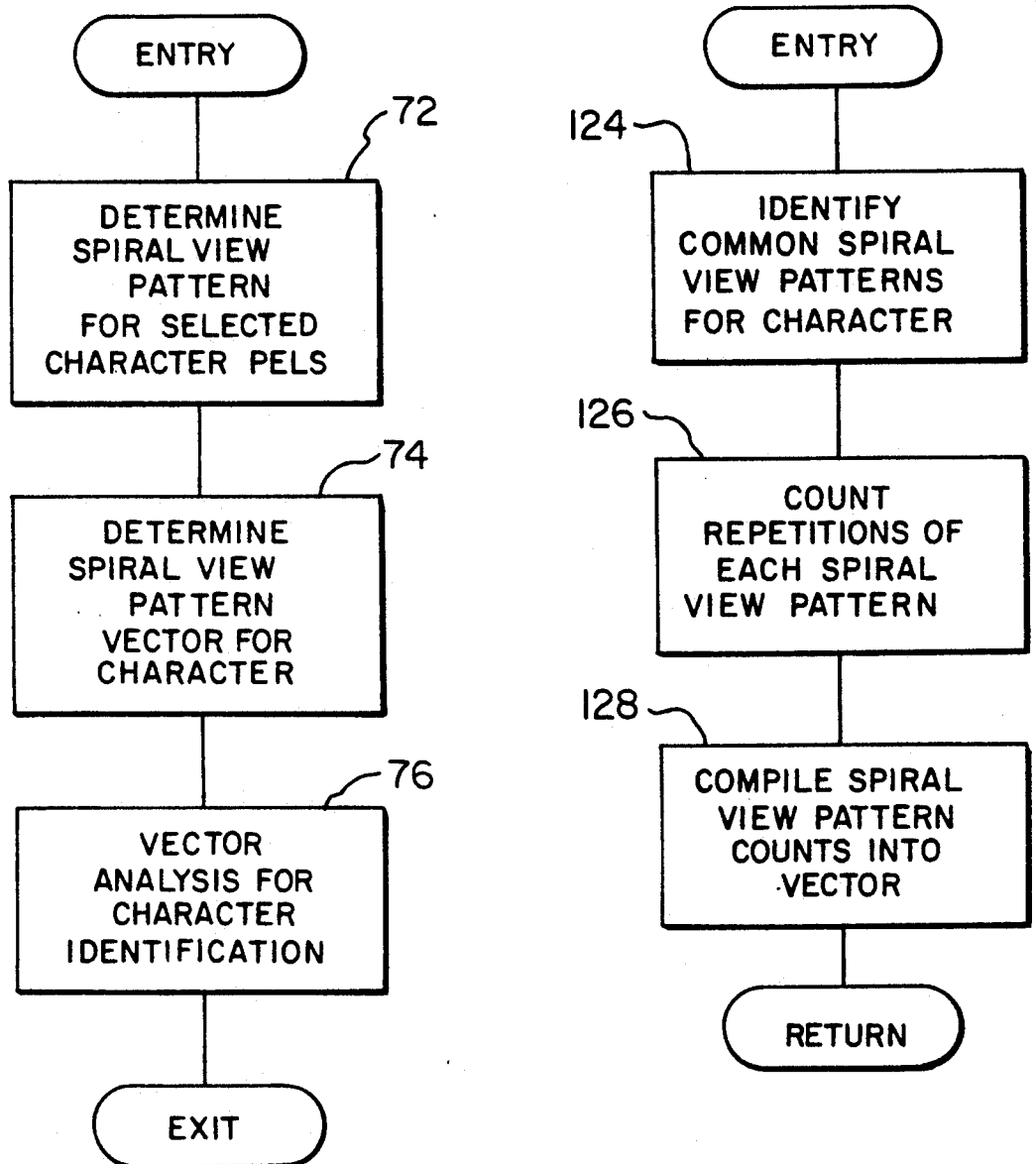
FIG. 10 shows a logic/flow diagram for the present invention implementing the use of spiral view patterns in an image document system.
FIG. 16 shows a logic/flow diagram for spiral view pattern, character vector determination as required in FIG. 10.
Figures 11, 14, 15:
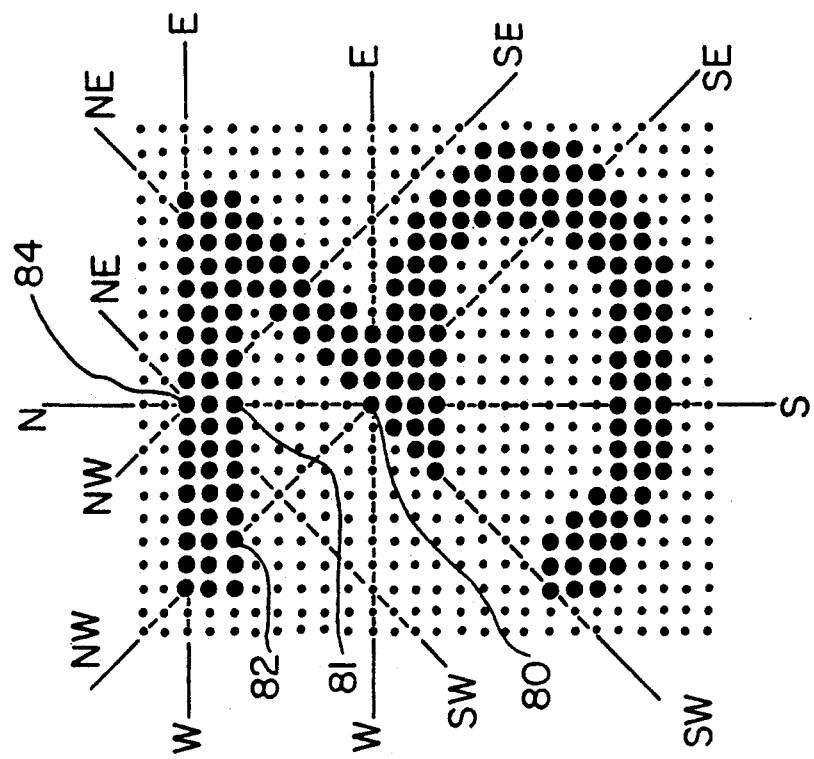
FIG. 11 is an example of a digitized character illustrating the eight views from a character pel near the center of the character and a character pel at the top of the character.
FIG. 14 is a tabulation of stroke measurements and the spiral view pattern for pel 80 in FIG. 11.
FIG. 15 is a tabulation of stroke measurements and the spiral view pattern for pel 84 in FIG. 11.

While the logic or flow in FIG. 3 is very effective in accomplishing character recognition, as just described, the logic or flow can be further enhanced by the use of spiral view patterns. In FIG. 10, there is a logic/flow diagram for using spiral view patterns. Entry to this flow diagram in FIG. 10 is after block 54, normalization (which is optional), in FIG. 3. The image of the character is digitized into pels, as described in FIG. 1. FIG. 11 shows a digitized image of the numeral three, and eight radial views identified by compass headings from a character or black pel 80 near the center of the numeral three and from pel 84 at the top of the numeral three.

At block 72, the spiral view pattern (described hereinafter in reference to FIGS. 12 and 13) for selected pels is determined. The selected pels in the preferred embodiment are the pels that make up the contour or outline of the character. Obtaining spiral view patterns for all black pels would give the most information for analysis; however, it would require significantly more computer time to run the process than if just the contour pels are used. A second alternative would be to normalize the character, as in FIG. 3, and just use a single pel width outline as the core of the character. Another alternative would be to use the interior pels of the character (all pels except the contour pels of the character).

After block 72 has generated a spiral view pattern for every contour character pel, block 74 generates a character vector from the spiral view patterns. This character vector is a compiled count-list or histogram of the spiral view patterns for the pels of that character.

The character vector may be analyzed by any number of processes depicted as block 76 in FIG. 10. In the preferred embodiments of the invention, either a linear decision network or a neural network are used. In the linear network, each spiral view pattern count in the character is weighted and summed with the other weighted spiral view pattern counts. The weighting is determined by training the network with thousands of character samples. The network will produce for each possible character a weighted sum from the character vector. The sums for each character are then compared, and the character with the highest weighted sum is identified as the recognized character. Any number of algorithms for identifying the character from the weighted sums may be used. A simple algorithm is: the highest sum if that sum is greater than a threshold value. Another algorithm is: the highest sum greater than a first threshold if the difference between the highest sum and the next highest sum is greater than a second threshold. The linear decision network analysis will be described in more detail hereinafter with reference to FIGS. 18 and 19.

When block 76 is implemented as a neural network, there is an intermediate layer of summed values produced by weighting and summing the counts of spiral view patterns from the character vector. The intermediate sums are representative of character features that tend to occur (or cluster) in similar groups. These intermediate summed values are limited and then weighted, limited and summed again to generate a sum value near zero, or one for each possible character in the character set. Only one class sum should have a value near one; that class identifies the character recognized from the character vector.

To understand how the spiral view patterns operate to enhance the recognition of the character, it is first necessary to understand the encoding of four spiral view codes 0, 1, 2, and 3 that are possible for each view direction. The conditions required to satisfy a given view code are depicted in the logic diagram of FIGS. 12A to 12D and are outlined below. The following terms are defined for the view codes:

"V" is the direction of View.

"V-45" is the view direction rotated 45° counterclockwise.

"$L_v$" is the length of the stroke in the view direction; i.e., the number of black pels traversed to reach the first white pel.

"$L_{v-45}$" is the length of the stroke in V-45 direction.

"$D_v$" is the distance to a remote stroke in V direction; i.e., the number of black pels (if any) and white pels traversed to reach the first black pel in the remote stroke.

"$D_{v-45}$" is the distance to a remote stroke in the V-45 direction.

The view code definitions are:

View Code 0:
   There is no remote stroke in the V direction and:
      No remote stroke in the V-45 direction and:
         The length of the stroke in the V direction is less than the length of the stroke in the V-45 direction;
      Or a remote stroke exists in the V-45 direction and:
         The length of the stroke in the V direction is less than the distance to the remote stroke.

View Code 1:
   There is no remote stroke in the V direction and:
      No remote stroke in the V-45 direction and:
         The length of the stroke in the V direction is greater than or equal to the length of the stroke in the V-45 direction;
      Or a remote stroke exists in the V-45 direction and:
         The length of the stroke in the V direction is greater than or equal to the distance to the remote stroke in the V-45 direction.

View Code 2:
   A remote stroke exists in the V direction and:
      No remote stroke exists in the V-45 direction and:
         The distance to the remote stroke in the V direction is less than the length of the stroke in the V-45 direction;
      Or a remote stroke exists in the V-45 direction and:
         The distance to the remote stroke in the V direction is less than the distance to the remote stroke in the V-45 direction.

View Code 3:
   A remote stroke exists in the V direction and:
      No remote stroke exists in the V-45 direction and:
         The distance to the remote stroke in the V direction is greater than or equal to the length of the stroke in the V-45 direction;
      Or a remote stroke exists in the V-45 direction and:
         The distance to the remote stroke in the V direction is greater than or equal to the distance to the remote stroke in the V-45 direction.

With the view code definitions in mind, the process for determining the view patterns for the character three in FIG. 11 begins by measuring the distances $L_v$, $L_{v-45}$, $D_v$, and $D_{v-45}$. The distances are then used in the logic in FIG. 12 to select the correct spiral view code.

To illustrate how the spiral view patterns are determined, the pattern number for pel 80, in FIG. 11, will be generated. Pels from which views are taken are also referred to herein as view pels. In the North view direction, decision 90 in FIG. 13 will branch yes to blocks 92 and 94 that respectively locate the first remote stroke pel 81 along the V (North) direction and measure the distance from view pel 80 to the pel 81. As depicted in FIG. 11, the distance $D_v$ is five pels.

Next, decision 96 tests for a remote stroke in the V-45 direction. Pel 80 does have a remote stroke in the NW direction so the decision branches yes to blocks 98 and 100. Block 98 locates the first remote stroke pel 82 in the V-45 (NW) direction. Step 100 measures the distance between pel 80 and pel 82. This distance $D_{v-45}$ is five pels.

Figure 12A:
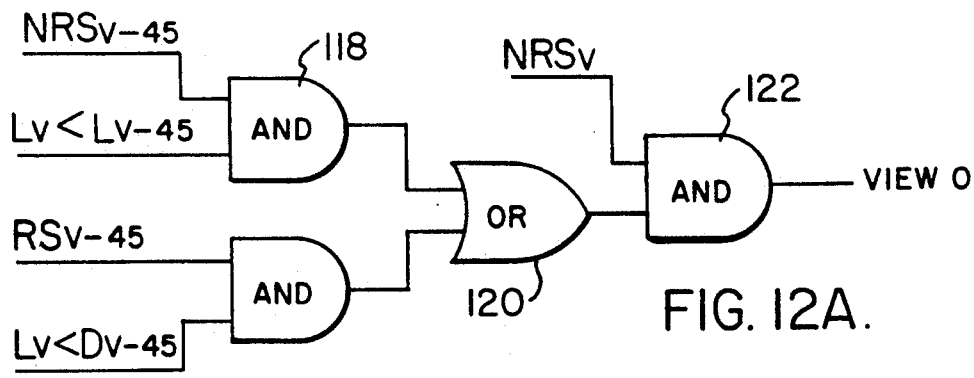
FIGS. 12A, 12B, 12C and 12D are the logic/flow diagrams for determining spiral view codes.
Figure 12B:
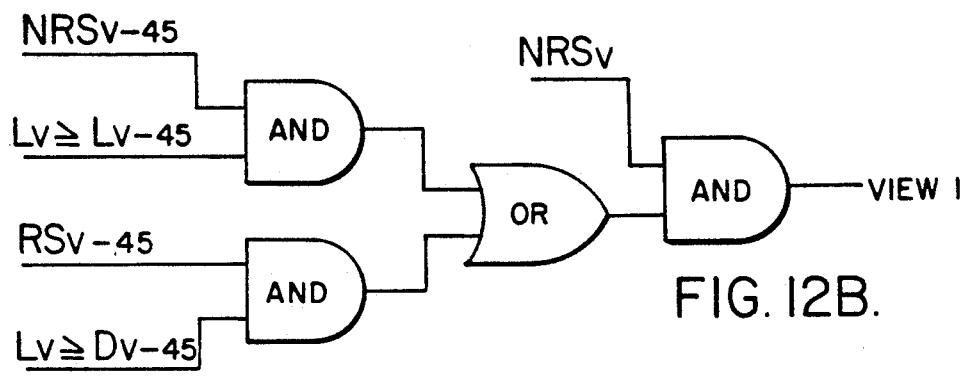
Figure 12C:
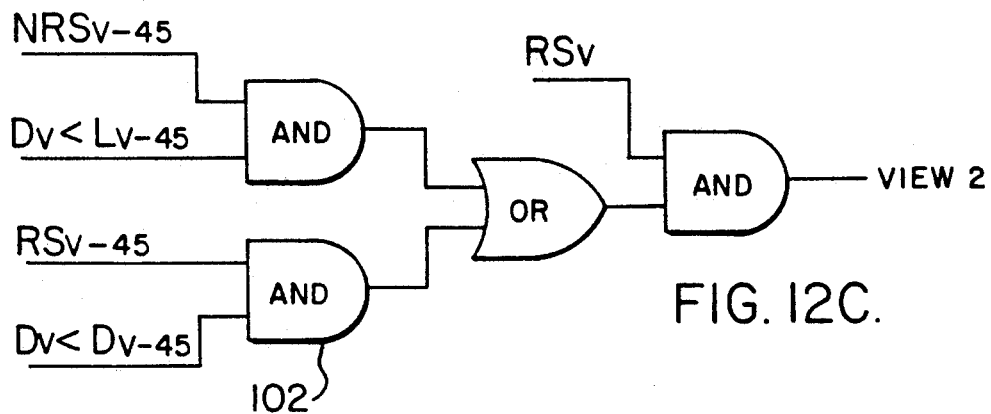
Figure 12D:
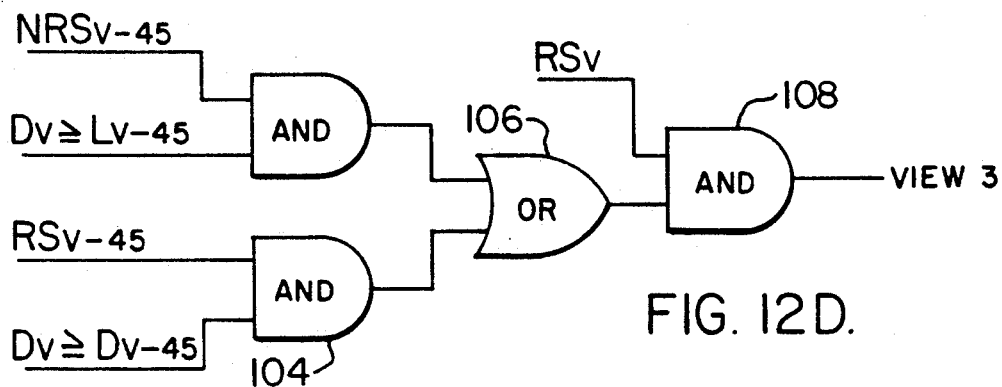
Figure 13:
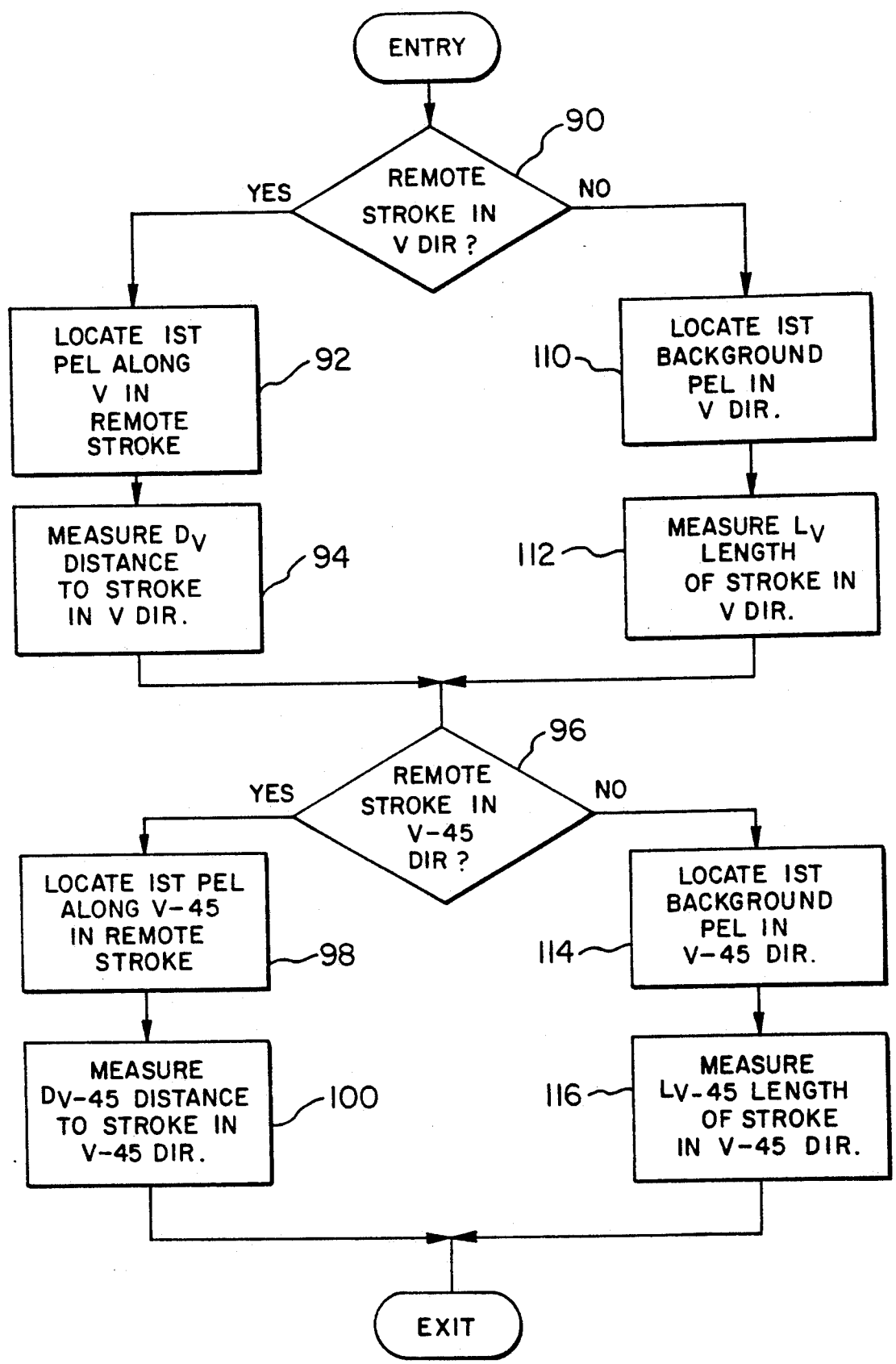
FIG. 13 shows a logic/flow diagram for measuring stroke characteristics used by spiral view code determination logic in FIGS. 12A-12D.

Applying the remote stroke information just determined in FIG. 13 to the logic flow diagram in FIGS. 12A-12D, the spiral view code from view pel 80 in the North direction ca be determined. Since there is a remote stroke in the view direction ($RS_v$), the logic flow in either FIG. 12C or 12D is applicable. Further, since there is a remote stroke in the Northwest direction ($RS_{v-45}$), AND gates 102 and 104 will be enabled. However, only AND gate 104 will have an output since $D_v = D_{v-45}$ (both distances are five pels). The output from AND 104 is passed by OR 106 and AND 108. Accordingly, the spiral view code for the North view is "3".

The logic flow shown in FIGS. 12A-12D is preferably implemented in software. Of course, it will be appreciated by one skilled in the art that these logic/flow diagrams, as well as the other logic/flow diagrams in the invention, can be implemented in hardware logic blocks, programmable array logic, or software. In any case, the preferred embodiment is software; i.e. computer programs running on a computer or data processing system.

The distances and remote stroke information necessary to determine the spiral view pattern for pel 80 in FIG. 11 are tabulated in FIG. 14. At the bottom of each column is the spiral view pattern code for that directional view from pel 80. The distances and view pattern codes can be arrived at by going through the above discussed processes for FIG. 13 and FIGS. 12A–12D.

A spiral view pattern for a given view pel is defined as the combination of the eight spiral view codes obtained for that pel. The spiral view pattern (SVP) for pel 80 obtained by listing the spiral view codes clockwise starting with North is 31033203. When each spiral view code for view pel 80 is converted to binary, the spiral view pattern is a 16 bit (2 bits for each view) number 1101001111100011.

In the preferred embodiment, a spiral view pattern would be determined for each pel on the contour of the character. As a second example of the determination of a spiral view pattern, the spiral view codes for view pel 84 in FIG. 11 will now be generated.

The process again is shown in FIG. 13 where for a Northwest view, decision 90 branches the flow right to blocks 110 and 112 because there is no remote stroke Northwest of pel 84. In the Northwest view, block 110 locates the background pel immediately adjacent to pel 84. Therefore, block 112 measures $L_v$ as zero pels. Decision 96 then checks for a remote stroke in the V-45 view (West). There is no remote stroke in the West direction so the flow branches to blocks 114 and 116. Step 114 locates the first background pel in the V-45 direction. Block 116 measures the length of the stroke in that direction; i.e., $L_{v-45}$ is eight pels. Applying this information to the logic flow in FIGS. 12A–12D causes the logic in FIG. 12A to be satisfied. AND 118 has an output since there is no remote stroke in V-45 view (NRS$_{v-45}$) and $L_v$ (zero pels) is less than $L_{v-45}$ (eight pels). The signal from AND 118 is passed by OR 120 and AND 122, which is enabled by no remote stroke in the Northwest view direction (NRS$_v$). Accordingly, the spiral view code for the NW view from pel 84 is "0".

FIG. 15 contains the tabulated distances, remote stroke information and spiral view pattern SVP for view pel 84. The spiral view pattern for pel 84, when spiral view codes are listed clockwise starting with the North view, is 11123010. When each spiral view code for pel 84 is converted to a binary number, the spiral view pattern is a 16 bit number 0101011011000100.

One other view from view pel 84 is worth noting because the view includes two remote strokes. This is the South view from pel 84. This view intersects both the center and bottom stroke of the numeral three in FIG. 11. In this situation, one could measure to the first or second remote stroke. In the preferred embodiment of the invention, the measurement is to the first remote stroke which is a distance of seven pels in the South view from pel 84.

The result of the processes in FIGS. 12 and 13 is a 16-bit number for each pel on the contour of the character. This 16-bit number is the spiral view pattern for its pel. Thus there are $2^{16}$ possible spiral view patterns from 0000000000000000 to 1111111111111111; i.e., from 0 to 65,535 (or 64k). Some of these patterns will not be used, and some of them will be repeated one or more times, as spiral views are determined for pels in the character to be recognized.

The next block in the character recognition process of FIG. 10 is block 74, the generation of a character vector from the spiral view patterns. This block is implemented in more detail in FIG. 16. Blocks 124 and 126 in FIG. 16 build counts for each spiral view pattern in the character being analyzed. Block 124 identifies common spiral view patterns in the character, while block 126 accumulates a count of all the pels that have the same spiral view pattern. When the count of repetitions for each spiral view pattern is complete, block 128 compiles the character vector by listing the counts in sequence from pattern 0 to pattern 65,535. In generalized form, the character vector is:

$$C = (c0, c1, c2, ..., cN, ..., c65535)$$

where cN is the count for spiral view pattern N.

Block 76 of FIG. 10 analyzes the character vector to identify the character. One implementation of analysis block 76 is the linear decision network in FIG. 17. The task of the linear decision network is to indicate the extent to which a character vector indicates that character is a predetermined character. Each spiral view pattern count is loaded into an associated input register in FIG. 17. The count c1 for spiral view pattern 1 is loaded into input register 130. Similarly, counts c2 through c65535 are loaded into registers. Only registers 132 and 134 for c2 and c65535 are shown. The count for c0 is forced to one, and a one count is loaded into register 129. The linear decision network requires register 129 to be loaded with a constant (in this case, a count of one). Since view pattern zero can not occur, this requirement is not detrimental to the recognition process.

Each of the counts is multiplied by a weighting factor and the weighted counts are summed for each possible character identification. For example, summing circuit 136, whose output value indicates possible classification as the numeral "0", performs the following sum:

$$\text{Class 0 Sum} = 1 \times W(0,0) + c2 \times W(0,1) + ... + cN \times W(0,N) + ... + c65535 \times W(0,65535)$$

Where:

"cN" is the count for spiral view pattern N;

"W(0,N) is the weighting factor for cN in Classification 0.

In effect, the Class 0 sum output from sum circuit 136 is the dot product of the character vector with a weighting vector for Class 0. Similarly, the Class 1, 2 and 3 sums from sum circuits 138, 140 and 142 are the dot products of the character vector with weighting vectors for Class 1, 2 and 3 respectively. There are as many summing circuits and weighting vectors as there are patterns in the character set; i.e., characters into which the character vector might be classified or recognized.

Figure 18:
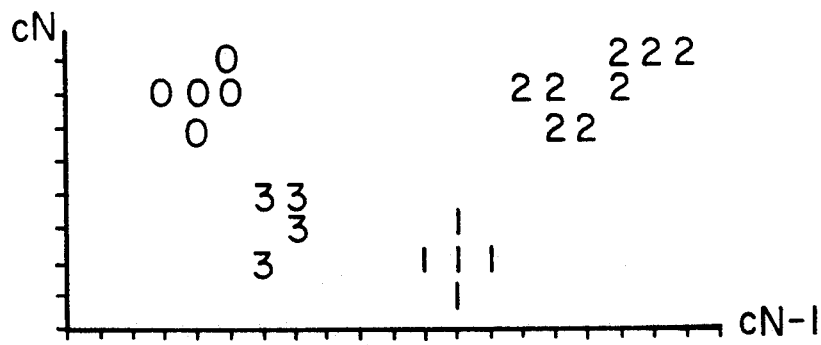
FIG. 18 is a scatter plot of two counts in character vectors for numerals 0, 1, 2 & 3.

FIG. 18 is a simple scatter plot illustrating how Class sums for numerals 0, 1, 2 and 3 cluster for input counts cN-1 and cN. In other words, in a two dimensional space whose X-axis is cN-1 and whose Y-axis is cN, the cN-1,cN coordinates for numeral one patterns will tend to cluster where the "1's" are in FIG. 18. Similarly, the cN-1,cN coordinates for numerals 0, 2 and 3 will also tend to cluster. Weighting factors may then be used to produce distinct Class sums for each of the numerals from counts cN-1 and cN occurring in analysis of the numeral's vector. For the simple example in FIG. 18, use of weighting factors W(0,1), W(0,2) with counts cN-1 and cN would increase the Class 0 sum, if the counts come from a numeral zero character pattern, or would decrease the Class 0 sum if the counts come from any other character pattern.

Graphically, each cluster in the scatter plot may be separated from the other clusters by a line. In a linear decision network, this line is drawn by the weighting factors. Of course, a complete scatter plot for the character vectors would have 64k dimensions. If one could picture such a space, the clusters would still exist, and they would be separable by a hyperplane (a plane in 64k-dimensional space). The weighting vectors used in the linear decision network would draw these hyperplanes to separate the clusters for character or symbol pattern classification.

Figure 17:
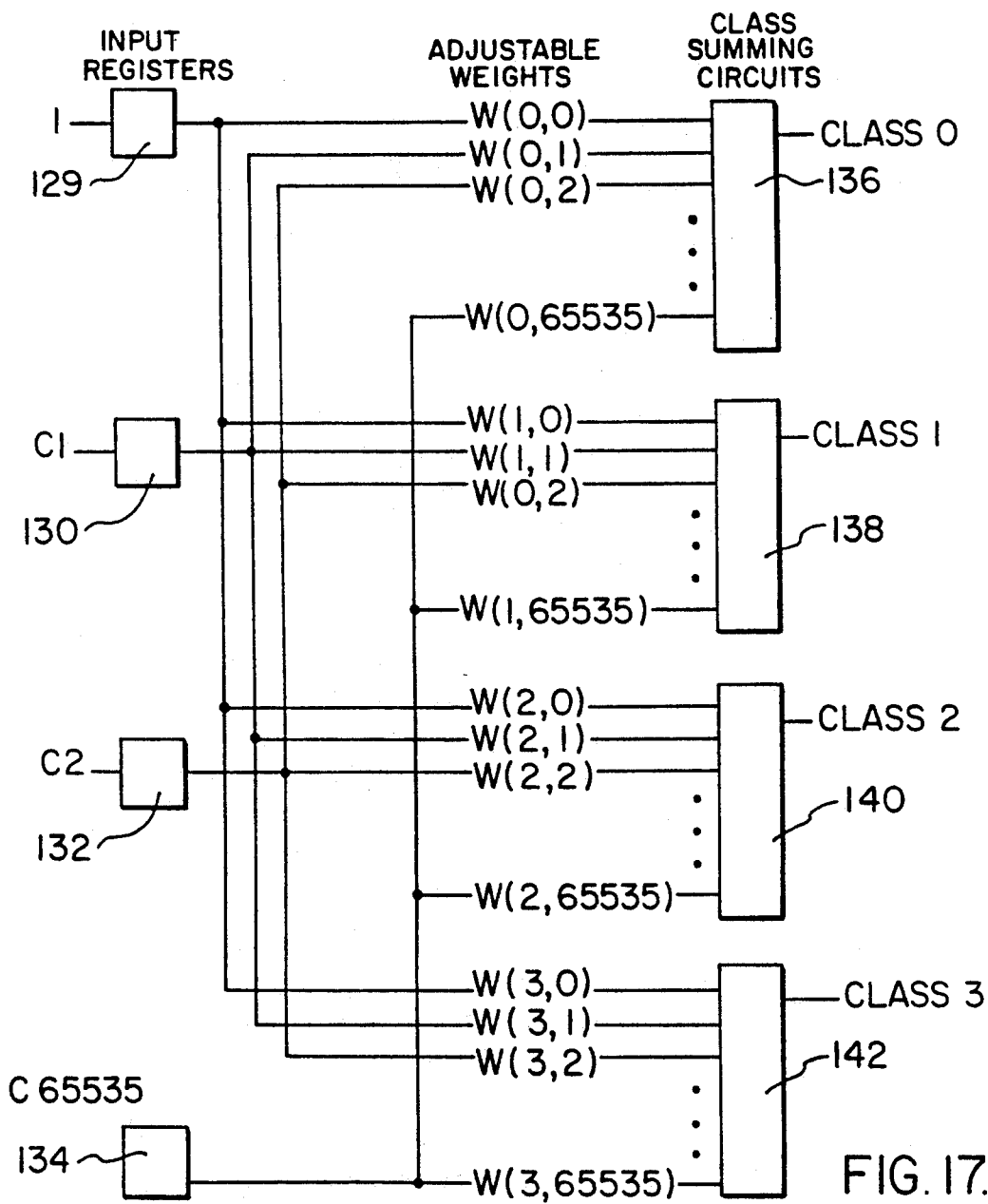
FIG. 17 is a logic/flow diagram of a linear decision network for character vector analysis as required in FIG. 10.

The weighting factors in FIG. 17 must be arrived at using training sets of thousands of characters. Each of the characters used for training is digitized into pels, spiral view patterns are determined for contour pels and a character vector is generated. Each count $cN$ in the character vector is used to develop a sample weighting factor that will increase the sum for the character identification, which is known, and to develop weighting factors that will decrease the sum for all other characters or symbol patterns.

Figure 19:
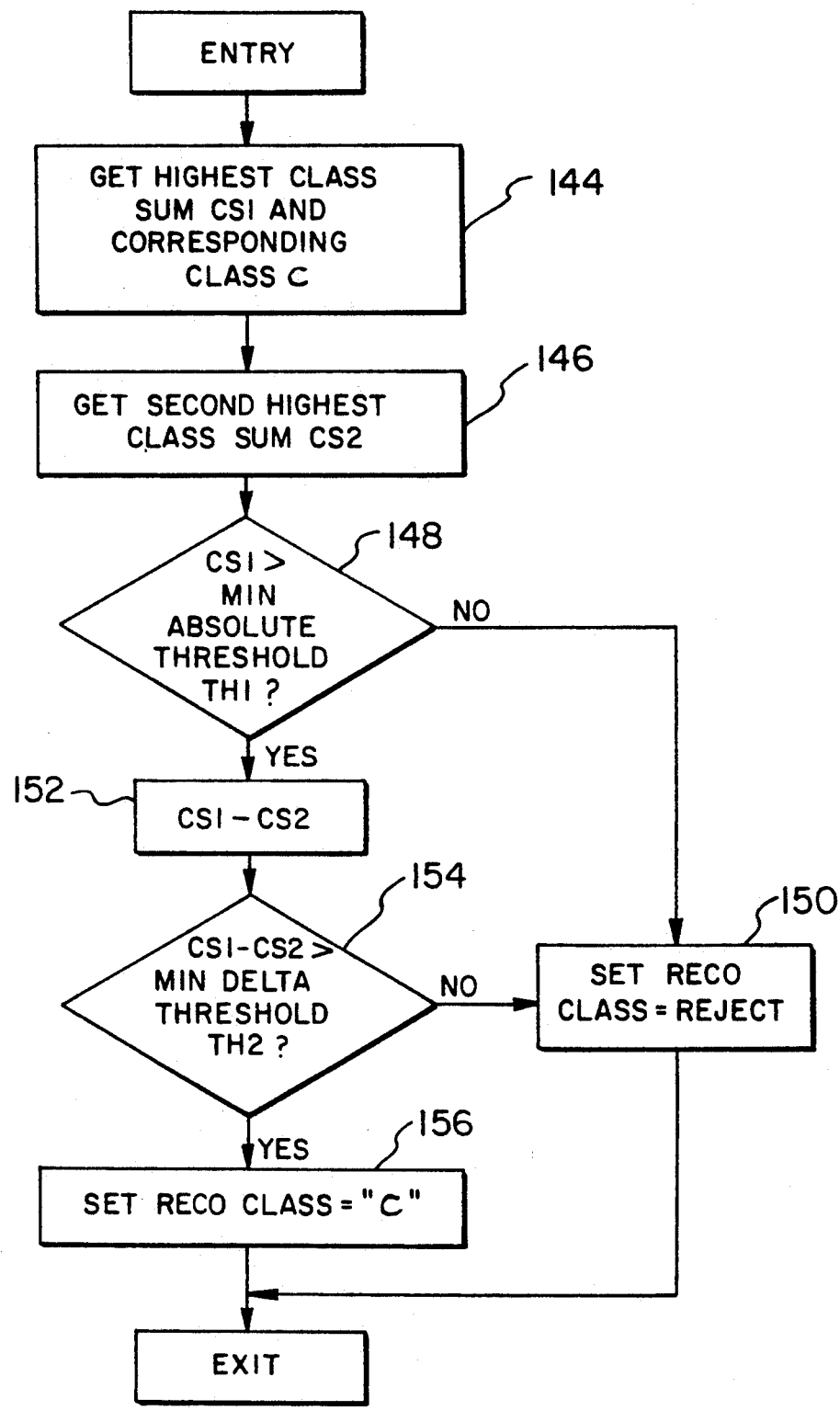
FIG. 19 is the logic/flow diagram for the recognition of the character from the weighted sums produced for each possible character by the linear decision network of FIG. 18.

FIG. 19 is the logic/flow diagram of the last portion of the character analysis based on a linear decision network. The final process is character recognition based on the Class sums from FIG. 17. Blocks 144 and 146 in the flow get the largest and second largest class sums (CS1 and CS2) from the summing circuits in FIG. 17. At the same time, block 144 also identifies the character Class C having the highest class sum CS1. Decision 148 then tests to see if the highest sum CS1 is greater than a minimum absolute threshold TH1. If CS1 is not greater than TH1, block 150 indicates the pattern or character cannot be recognized, and the flow exits ending the process for that digitized character.

If CS1 is greater than the minimum threshold TH1, the character represented by CS1 could be identified as the scanned character. However, for more accuracy, block 152 in FIG. 19 takes the difference between CS1 and CS2. Decision 154 then tests this difference against a minimum delta threshold TH2. If the difference is less than TH2, the flow branches t block 150 and again the character is indicated as not recognized. If the difference is greater than TH2, block 156 than identifies the character as "C", the character represented by the class having the highest sum CS1. The character recognition is successfully completed.

Figure 20:
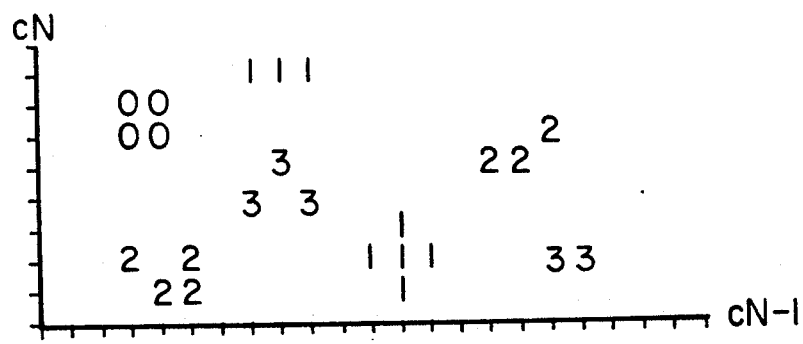
FIG. 20 is a cluster diagram of character vectors for characters that have few constraints, such as handwritten characters or low constraint machine-print characters.

If the characters to be recognized have few constraints on their shape as in unconstrained hand-print or free-form machine-print (omni characters), there is considerable more variability within each class. For example, the tops of numeral 3's may be curved or flat, the right sides of 4's may be open or closed, etc. In these cases, subclusters of counts for each class of characters will form. FIG. 20 is a scatter plot of counts $cN-1$ and $cN$ of pel view patterns N-1 and N. In this scatter plot, the counts for several of the character vectors have two subclusters (see the double clusters for counts from characters "1", "2"and "3" in FIG. 20). These subclusters for a given class are not linearly separable as a pair. Therefore, instead of using a linear decision network, as in FIG. 17, the analysis is done with a feed-forward neural network as shown in FIG. 21.

The neural network functions in a manner similar to the linear decision network with two significant differences. First, an intermediate summing circuit layer exists between the input count registers and the final classification summing circuits, and second, the summing circuits include limiters that limit the value of the sum between zero and one. The function of the intermediate layer is to classify the subclusters or character features. The output sums for the classes of subclusters will have their sums weighted and limited to arrive at the final classification for character recognition. In effect, the intermediate layer is the dot product of the character vector with subcluster weighting vectors to produce a subcluster vector or character feature vector. Thereafter, the final summing layer is the dot product of the subcluster vector with a weighting vector to classify the subcluster vector, or feature vector, into a character class.

Figure 21:
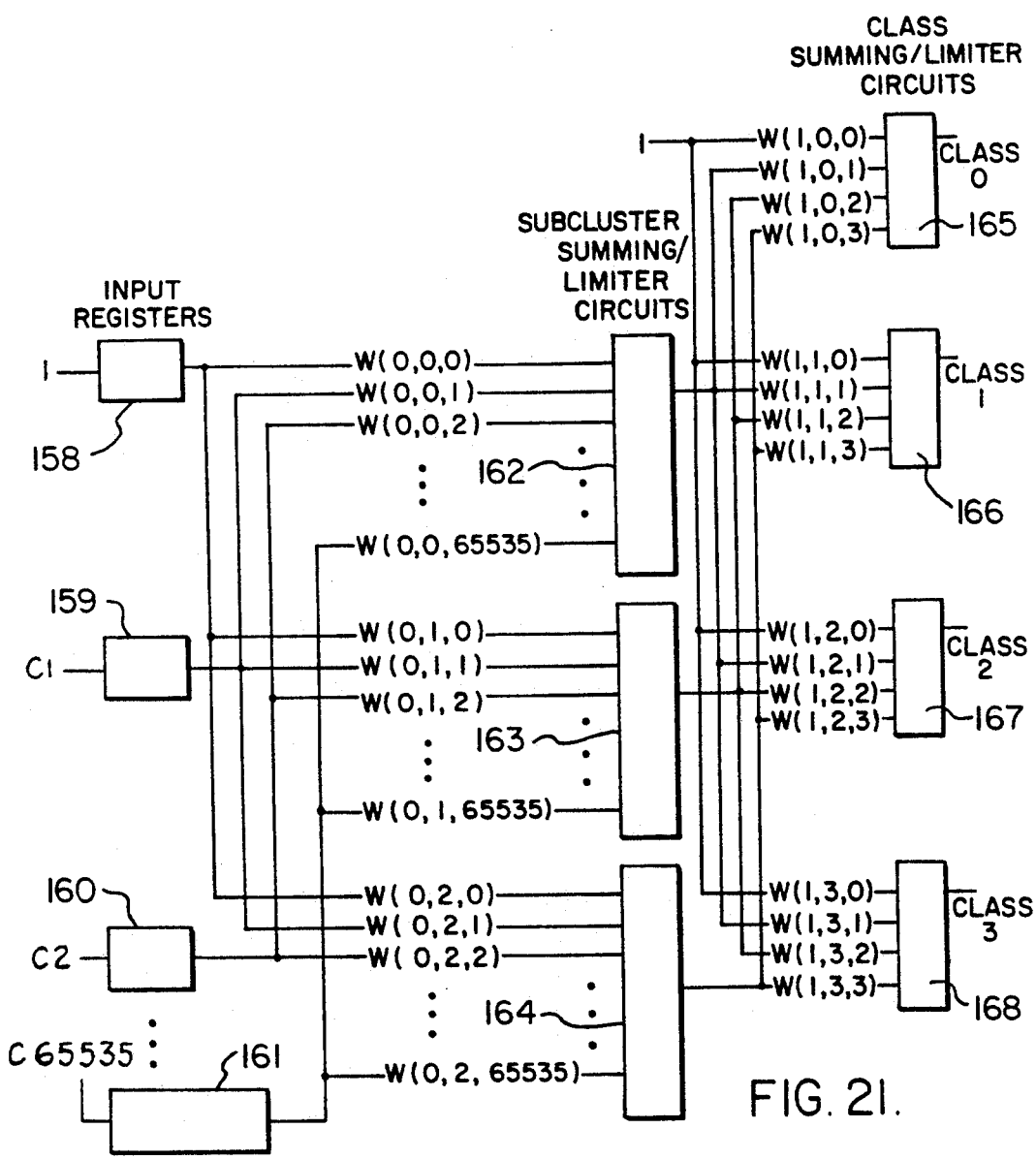
FIG. 21 is a logic/flow diagram of a neural network for character vector analysis as required in FIG. 10; the neural network is adept at identifying characters when character vectors are clustered as in FIG. 20.

In FIG. 21, input registers 159-161 receive the spiral view pattern counts; i.e., the character vector, in the same manner as the input registers in FIG. 17. Again, the input register for count $c0$ is loaded with a count of 1. All other counts $c1$ to $c65535$ are loaded into their respective registers (only the registers for $c1$, $c2$ and $c65535$ are shown). Each of these counts is weighted by a weighting factor associated with each of the subcluster summing/limiter circuits 162, 163 and 164. Only three subcluster limiting circuits are shown. There would a subcluster summer for each of the subclusters. Each of the subcluster summing/limiter circuits includes a limiting circuit whose function is to approximate a step function. In other words, the output of each of the subcluster circuits 162-164 will be a value near zero or one.

Likewise, each of the class summing/limiter circuits 165-168 are a combination summing circuit and a nonlinear step function approximation circuit. Class 0 circuit 165 performs the dot product of the subcluster vector with the Class 0 weighting vector and limits the result to be near zero or one. Circuits 166, 167 and 168 perform the same function for Classes 1, 2 and 3, respectively. Of course, there would be as many class summing/limiter circuits as there are patterns, or characters in the character recognition set. A character vector is classified (the character is recognized) if one, and only one, of the class summing/limiter circuits has an output value near one and all other class summing/limiter circuits has an output value near zero. Otherwise, the character is rejected as not recognized.

The weights used in the weighting vectors for FIG. 21 are generated from a representative training set by any one of a number of standard neural network training techniques. Two such techniques are taught in the following publications: David Rumelhart and James McClelland, *Parallel Distributed Processing*, Volume I, MIT Press, (c) 1988, pp. 322-330; Sara Solla et al, "Accelerated Learning in Layered Neural Networks", *Complex Systems*, Volume II, No. 6, Complex Systems Publications, Inc., (c) 1988, pp. 625-639.

While a number of preferred embodiments of the invention have been shown and described, it will be appreciated by one skilled in the art, that a number of further variations or modifications may be made without departing from the spirit and scope of my invention.

What is claimed is:

1. A method for recognizing characters in a character recognition system having a scanner for scanning characters and generating a scanned image and an image digitizer for digitizing the scanned image into a character pattern of pels, said method comprising the steps of:
   scanning a character with the scanner;

digitizing the scanned character with the digitizer;

determining a digital word including information indicative of a digitized view of strokes of the character for a plurality of radial view directions from a view pel and indicative of the length of a first stroke measured in a first radial view direction from the view pel relative to the length of the first stroke measured in a adjacent view direction, and indicative of the distance from the view pel to a remote stroke in the first direction relative to the distance to a remote stroke in the adjacent direction;

generating a character vector from a plurality of said digital words determined from various view pels in the character scanned by the recognition system; and analyzing said character vector in a logical network to classify the scanned character and, based on the classification, to identify the scanned character as a character in a predetermined character set.

2. The method of claim 1 wherein said determining step comprises the steps of:

measuring length of the first character stroke from the view pel in the first view direction and the adjacent view direction;

testing for an occurrence of a remote stroke in the first view direction and adjacent view direction; and measuring distance to the remote stroke from the view pel if the remote stroke occurs in the first view direction or the adjacent view direction.

3. The method of claim 2 wherein said determined step further comprises the steps of:

comparing the first stroke length, and distance to the remote stroke, in the first view direction to the first stroke length, and distance to the remote stroke, in the adjacent view direction; and encoding the result of the comparing step into a spiral view code.

4. The method of claim 3 wherein said generating step further comprises:

compiling the spiral view code for each view direction from the view pel into a list of codes to form said digital word for the view pel.

5. The method of claim 4 wherein said character vector generating step comprises the steps of:

identifying common digital words from all the view pels in the character being scanned;

counting the repetitions of each of the common digital words to thereby produce a count for each digital word; and compiling the counts into a histogram of all possible digital words and thereby forming a character vector.

6. The method of claim 5 wherein said character vector analyzing step comprises the steps of:

generating a dot product of said character vector and a weighting vector for each character in the predetermined character set; and comparing the highest dot product to a threshold and identifying the scanned character as the character associated with the highest dot product if the threshold is exceeded.

7. The method of claim 6 wherein said comparing step comprises the steps of:

comparing the highest dot product value to a first threshold value;

subtracting the second highest dot product value from the highest dot product value to generate a delta value;

comparing the delta value to a second threshold value; and identifying the scanned character as the character associated with the highest dot product value if both the first and second threshold values are exceeded.

8. The method of claim 5 wherein said character vector analyzing step comprises the steps of:

generating a subcluster dot product of said character vector and a subcluster weighting vector for each subcluster in a predetermined subcluster set;

limiting each of the subcluster dot products to a value between zero and one;

forming a subcluster vector from all of the limited subcluster dot products;

generating a character dot product of said subcluster vector and a weighting vector for each character in the character set;

limiting each of the character dot products to a value between zero and one; and identifying the scanned character as the character associated with the limited character dot product having a value closest to one.

9. The method of claim 1 wherein said character vector generating step comprises the steps of:

generating a count for common digital words from all the view pels in the character being scanned; and compiling the counts into a histogram for all possible said digital words to form a character vector.

10. The method of claim 9 wherein said count generating step comprises the steps of:

identifying common digital words from all the view pels in the character being scanned; and counting the repetitions of each of the common digital words to thereby product a count for each digital word.

11. The method of claim 1 wherein said character vector analyzing step comprises the steps of:

generating a dot product of said character vector and a weighting vector for each character in the predetermined character set; and comparing the highest dot product to a threshold and identifying the scanned character as the character associated wit the highest dot product if the threshold is exceeded.

12. The method of claim 11 wherein said comparing step comprises the steps of:

comparing the highest dot product value to a first threshold value;

subtracting the second highest dot product value from the highest dot product value to generate a delta value;

comparing the delta value to a second threshold value; and identifying the scanned character as the character associated with the highest dot product value if both the first and second threshold values are exceeded.

13. The method of claim 1 wherein said character vector analyzing step comprises the steps of:

generating a subcluster dot product of said character vector and a subcluster weighting vector for each subcluster in a predetermined subcluster set;

limiting each of the subcluster dot products to a value between zero and one;

forming a subcluster vector from all of the limited subcluster dot products;

generating a character dot product of said subcluster vector and a weighting vector for each character in the character set;

limiting each of the character dot products to a value between zero and one; and identifying the scanned character as the character associated with the limited character dot product having a value closest to one.

14. Character recognition apparatus for identifying a character from a character set where the character to be identified has been scanned and digitized to convert the character's printed image in to a electronic digitized image of rows and columns of character pels and background pels, said apparatus comprising:

means for measuring the length of strokes and the distance to remote strokes in eight radial view directions from selected view pels in the scanned character;

means for comparing the stroke length of a first stroke and the stroke distance to a remote stroke, if any, along one radial view from a view pel to the stroke length of the first stroke and stroke distance to a remote stroke, if any, along the next adjacent radial view form the save view pel and generating a spiral view code for each of the eight views and a spiral view pattern for the view pel;

means for compiling the spiral view patterns for the selected pels form the scanned character into a character vector; and means for weighting the compiled patterns with a set of weighting factors respectively associated with the characters in a predetermined character set and summing said compiled, weighted patterns to classify the character scanned as a character in the character set.

15. The apparatus of claim 14 wherein the selected view pels are the contour pels of the scanned character.

16. The apparatus of claim 14 wherein the selected view pels are the core pels of the scanned character.

17. The apparatus of claim 14 wherein the selected view pels are all pels of the scanned character.

18. The apparatus of claim 14 wherein said compiling means comprises:

means for counting the repetitions of spiral view patterns from the scanned character and generating a count for each possible spiral view pattern; and means for listing the counts in sequence according to each count's spiral view pattern and thereby forming the character vector.

19. The apparatus of claim 18 wherein said weighting and summing means comprises:

linear decision means for multiplying each count in the character vector with weighting factors associated with that count and with each character from the predetermined character set and for summing the weighted counts to produce from the character vector a class sum associated with each character in the predetermined character set; and comparing means for comparing the highest class sum to a threshold and identifying the scanned character as the character associated with the highest class sum if the threshold is exceeded.

20. The apparatus of claim 18 wherein said weighting and summing means comprises:

linear decision means for multiplying each count in the character vector with weighting factors associated with that count and with each character from the predetermined character set and for summing the weighted counts to produce from the character vector a class sum associated with each character in the predetermined character set; and comparing means for comparing the highest class sum to a first threshold and for comparing the difference between the highest class sum and the second highest class sum to a second threshold and thereby identifying the scanned character as the character associated with the highest class sum if both thresholds are exceeded.

21. The apparatus of claim 18 wherein said weighting and summing means comprises: neural means comprising:

means for multiplying each count in the character vector with a weighting factors associated with that count and with each subcluster from the predetermined subcluster set, and for summing the weighted counts associated with each subcluster into subcluster sums and limiting each subcluster sum to a value between zero and one; and second means multiplying each subcluster sum with weighting factors associated with that subcluster sum and with each of the characters in the predetermined character set and for summing the weighted subcluster sums associated with each character in the predetermined character set into character sums and limiting the character sums to a value between zero and one and thereby identifying the scanned character as the character associated with the character sum closest to one.

* * * * *

UNITED STATES PATENT AND TRADEMARK OFFICE
CERTIFICATE OF CORRECTION

PATENT NO. : 5,303,311
DATED : April 12, 1994
INVENTOR(S) : Alec K. Epting, et al.

It is certified that error appears in the above-identified patent and that said Letters Patent is hereby corrected as shown below:

Col. 8, line 52: Change "ca" to --can--.
In Claim 1, col. 13, line 8: Change "a" to --an--.
In Claim 10, col. 14, line 38: Change "product" to --produce--.

In Claim 11, col. 14, line 42: Change "a" to --the--.

In Claim 11, col. 14, line 47: Change "wit" to --with--.

In Claim 13, col. 15, line 5: Change "the" to --a--.

In Claim 14, col. 15, line 29: Change "form" to --from--.

In Claim 14, col. 15, line 29: Change "save" to --same--.

In Claim 14, col. 15, line 33: Change "form" to --from--.

In Claim 21, col. 16, line 34: Following "comprises", delete ":".

In Claim 21, col. 16, line 37: Following "vector with", delete "a".

In Claim 21, col. 16, line 38: Change "the" to --a--.

Signed and Sealed this

Ninth Day of August, 1994

Attest:

BRUCE LEHMAN

Attesting Officer     Commissioner of Patents and Trademarks